United States Patent [19]

Kamiji et al.

[11] Patent Number: 4,695,075
[45] Date of Patent: Sep. 22, 1987

[54] AIR BAG DEVICE FOR VEHICLES
[75] Inventors: Koichi Kamiji; Toshikazu Ohya, both of Tochigi, Japan
[73] Assignee: Honda Giken Kogyo Kabushiki Kaisha, Tokyo, Japan
[21] Appl. No.: 787,909
[22] Filed: Oct. 16, 1985
[30] Foreign Application Priority Data
  Oct. 16, 1984 [JP] Japan .................. 59-156221[U]
[51] Int. Cl.⁴ ............................................. B60R 21/12
[52] U.S. Cl. .................................................... 280/735
[58] Field of Search ............................... 280/734, 735
[56] References Cited
  U.S. PATENT DOCUMENTS
  3,874,695  4/1975  Abe et al. ............................. 280/735
  3,949,357  4/1976  Hosaka ................................. 280/735

4,384,734  5/1983  Yasui .................... 280/735

FOREIGN PATENT DOCUMENTS
55130  5/1977  Japan .................... 280/735

Primary Examiner—John J. Love
Assistant Examiner—Ross Weaver
Attorney, Agent, or Firm—Irving M. Weiner; Joseph P. Carrier; Pamela S. Burt

[57] ABSTRACT

In an air bag device (1) for a vehicle having an ignition switch (7) operatively connected to an electric power source (1a), an air bag trigger circuit, (5) comprising an impact sensing circuit (3) including an impact sensor (10a, 10b) and an air bag inflation squib (4) connected in series to the sensing circuit (3), is substantially directly connected to the power source (1a).

3 Claims, 2 Drawing Figures 4,695,075

AIR BAG DEVICE FOR VEHICLES

BACKGROUND OF THE INVENTION

1. Field of the Invention

The present invention generally relates to an air bag device for vehicles. More particularly, the invention relates to an air bag device for vehicles of the type in which an air bag is adapted to be inflated with high-pressure gases, by exploding a squib to thereby trigger a high-pressure gas source, when the vehicle is subjected to an impact (deceleration) of a larger magnitude than a predetermined value, such as due to a collision.

2. Description of Relevant Art

Conventionally, there have been proposed various air bag devices for vehicles, in which, when the vehicle was subjected at a collision thereof to an impact of a larger magnitude than a predetermined value, an air bag disposed in the front part of a passenger room of the vehicle was expanded to be inflated by exploding a squib to trigger a high-pressure gas source, thereby protecting the driver from the impact.

Some of those air bag devices were such that a collision detecting sensor circuit was constituted with a plurality of collision sensors connected in series to each other and each respectively provided with a resistor connected in parallel thereto. The sensor circuit was adapted to be short-circuited by bringing the collision sensors into closed states thereof when, at a collision of the vehicle, the impact thereon is of a magnitude larger than the predetermined value, whereby a short circuit current was conducted across the squib which was connected in series to the sensor circuit, to explode the squib, so that, with high-pressure gases, the air bag was caused to expand to be inflated.

In this respect, in the accompanying drawings, FIG. 2 shows an electrical circuit diagram of a conventional air bag device of such type, which device is designated by reference numeral 100 in FIG. 2. The air bag device 100 included an air bag trigger circuit 105 as a series circuit consisting of an air-bag-oriented fuse 102, a collision sensing circuit 103, and a squib 104, which circuit 105 was connected in series through an ignition switch 107 and a main fuse 120 to a power source 101. The trigger circuit 105 had in parallel therewith a trouble detection circuit 108 connected thereto through a fuse 106. The circuit 108 was adapted to detect for troubles of a pair of collision sensors 110a, 110b (of such a type that is disclosed in U.S. Pat. No. 3,974,350) in the circuit 105. The trouble detection of the collision sensors 110a, 110b by the detection circuit 108 was performed in dependence on variations in the quantity of an electric current flowing between terminals of respective shunt resistors 113a, 113b provided for the collision sensors 110a, 110b. Incidentally, in FIG. 2, designated at reference numeral 109 is an electrical equipment circuit as a circuit of electrical equipment such as a wiper motor, including control switches thereof. This circuit 109 was connected in parallel to the air bag trigger circuit 105 as well as to the trouble detection circuit 108. The collision sensors 110a, 110b were normally open, while the shunt resistors 113a, 113b had resistances of such values that, with an electric current running only through them, the squib 104 could not be exploded. Under the condition that the ignition switch 107 is turned on, the current sent to the squib 104 was conducted from the power source 101 through only the resistors 113a, 113b, thus keeping it from exploding. In this respect, if the vehicle experiences such a collision that produces an impact of a larger magnitude than a predetermined value, the collision sensors 110a, 110b were concurrently operated in a self short circuit manner to short-circuit the collision sensing circuit 103, sending a short circuit current to the squib 104 to explode same, whereby an air bag (not shown) was expanded to be inflated.

With such air bag device, when a vehicle was caused to experience a collision, the driver was effectively protected from the impact thereof.

However, as shown in FIG. 2 also, in such a conventional air bag device, in which an ignition switch as well as a main fuse was interposed as an interruptable element between an electric power source and an air bag trigger circuit, under the condition that the ignition switch is not yet operated to be turned on the trigger circuit was kept from functioning, as a matter of course. Additionally, the ignition switch as once operated might be put in an open state of short duration such as by the chattering thereof, constituting a cause of misfire of a squib.

Moreover, in general, in a vehicle equipped with such an air bag device, the power source consisting of a battery storage was installed beneath the hood of the vehicle while the ignition switch was disposed in the vicinity of a steering wheel. Such a configuration required that a wiring harness connecting the power source to the ignition switch be necessarily rendered relatively long and provided with all the more connections (eg. 120a, 120b, 107a, 107b of FIG. 2), resulting in an enlarged total resistance of wires from the power source to the air bag trigger circuit, as well as an increased possibility of disconnection.

Further, in such air bag device, the ignition switch had at the lower potential side thereof an electrical equipment circuit connected thereto in parallel with the air bag trigger circuit, with the possibility that stable current supply to the trigger circuit might be disturbed by occasional voltage drops due to load effects of associated electrical equipment in service.

In this respect, to decrease such possibility, if the power source was simply directly connected to the air bag trigger circuit, without interposing interruptable elements such as the ignition switch therebetween, then an electric current would have to be always sent to the squib, through shunt resistors connected in parallel to collision sensors, even while the ignition switch is not yet operated, thus resulting in hastened deterioration of the squib. Moreover, for the prevention thereagainst, if an additional relay adapted to close when the ignition switch is operated was connected in series to a collision sensing circuit consisting of the collision sensors and the shunt resistors, then the relay might chatter, with the the fear of occasionally rendering the trigger circuit inoperative.

The present invention has been achieved to effectively solve such problems of conventional air bag devices for vehicles.

SUMMARY OF THE INVENTION

According to the present invention, there is provided, in an air bag device for a vehicle having an electric power source, and an ignition switch operatively connected to the power source, an improvement comprising an air bag trigger circuit substantially directly connected to the power source, wherein the trigger circuit comprises an impact sensing circuit including an impact sensor adapted to close when the vehicle is subjected to an impact of a larger magnitude than a predetermined value, and an air bag inflation squib adapted for expanding to inflate an air bag and connected in series to the sensing circuit, such that when the impact sensor is closed, a short circuit current is conducted across the squib, thereby causing the squib to expand to inflate the air bag.

Accordingly, an object of the present invention is to provide an air bag device for vehicles, which is always operable irrespective of the on-off state of an ignition switch, and in which the possibility of disconnection is minimized, thus also minimizing the fear of misfire of an air bag inflation squib.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
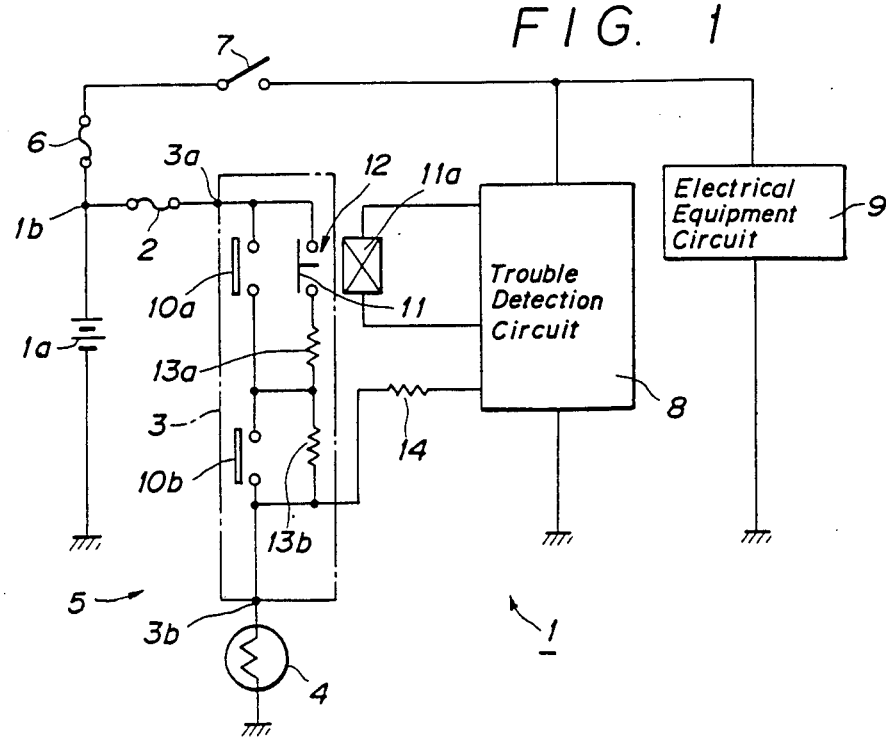
FIG. 1 shows an electric circuit diagram of an air bag device for vehicles according to a preferred embodiment of the present invention.

Referring now to FIG. 1, designated at reference numeral 1 is the entirety of an air bag device for vehicles according to a preferred embodiment of the present invention. The air bag device 1 comprises a direct-current power source 1a grounded at the negative side thereof, an impact sensing circuit 3 connected at one terminal 3a thereof through no more than a fuse 2 and thus substantially directly to a positive terminal 1b of the power source 1a, and a squib 4 connected in series to another terminal 3b of the sensing circuit 3, which is grounded thereacross. The impact sensing circuit 3 has positioned between the terminals 3a, 3b a pair of impact sensors 10a, 10b (of such a type that is disclosed in U.S. Pat. No. 3,974,350) connected in series to each other and a pair of shunt resistors 13a, 13b connected in parallel to the sensors 10a, 10b, respectively. A relay switch 12 is connected in series to the resistor 13a, which switch 12 has an on-off contact 11 thereof adapted to be interposed in series between the terminal 3a and the resistor 13a when operated by energizing a later-described actuation part of the switch 12.

The impact sensing circuit 3 is adapted to cooperate with the squib 4 to constitute an air bag trigger circuit 5 for expanding to inflate an air bag when a vehicle equipped with the air bag device 1 is caused to experience such a collision that the impact thereof on the vehicle is of a larger magnitude than a predetermined value.

The trigger circuit 5 has in parallel therewith a trouble detection circuit 8 connected through an ignition switch 7 and a main fuse 6 to the positive terminal 1b of the power source 1a, which circuit 8 is adapted to detect for troubles of the two impact sensors 10a, 10b in the impact sensing circuit 3 of the circuit 5. Moreover, in parallel to the detection circuit 8, there is connected an electrical equipment circuit 9 as a circuit of electrical equipment such as a wiper motor and various lights, including control switches thereof.

The impact sensors 10a, 10b are both open, thus conducting no currents, under ordinary conditions, while they are adapted to close when subjected to an impact of a larger magnitude than a predetermined value, conducting a trigger current to the squib 4, irrespective of the on-off state of the ignition switch 7.

The relay switch 12 has an excitation coil 11a as the actuation part thereof for operating to close the contact 11, the wiring connection at both terminals of which coil 11a is practically made in the trouble detection circuit 8 in such a manner that the the coil 11a is connected in series to the ignition switch 7 and, hence, the on-off action of the relay switch 12 is interlocked or in coincidence with that of the ignition switch 7.

According to foregoing connection of relay switch 12 and impact sensors 10a, 10b, while the ignition switch 7 is not yet operated to turn on, the impact sensing circuit 3 as well as the squib 4 has no currents conducted therethrough, provided that the sensors 10a, 10b are not subjected to any impacts larger in magnitude than the predetermined value. On the other hand, when the vehicle is caused to experience such a collision that the impact is of a magnitude larger than the predetermined value, then the impact sensors 10a, 10b concurrently close, conducting a trigger current across the squib 4, thus expanding to inflate the air bag, regardless of whether the ignition switch 7 as well as the relay switch 12 is turned on or off.

The trouble detection circuit 8 is adapted to start, when the ignition switch 7 is closed, functioning to inform the driver, if the current running through the impact sensing circuit 3 is varied in quantity from a below-described ordinary state thereof, of the abnormality of the sensing circuit 3 by way of lighting a trouble indication element (not shown).

In this respect, while the ignition switch 7 is closed, the excitation coil 11a of the relay switch 12 is energized with a current passing therethrough and hence the contact 11 thereof also is closed.

Thus, when the sensing circuit 3 is free of abnormality, then, under the condition that the ignition switch 7 is closed, there is conducted through the circuit 3 an electric current of such a quantity that is determined depending on the sum of respective resistances of the shunt resistors 13a, 13b and the squib 4, while inner resistances of the fuse 2, relay switch 12, associated wires, and the like are supposed to be neglectable.

However, if, in a circuit shunting from the power source side terminal 3a to the squib side terminal 3b of the impact sensing circuit 3 via the shunt resistors 13a, 13b, a disconnection is caused, then the sensing circuit 3 has no currents conducted therethrough. Such zero-current state may be caused by disconnection at the fuse 2 and/or squib 4.

Still however, under the condition that either of the impact sensors 10a, 10b is out of order and happens to close in spite of the fact that no collision is experienced, there is caused an increase in the current running through the impact sensing circuit 3.

Depending on such variations of the electric current running through the impact sensing circuit 3 as described above, the trouble detection circuit 8 is detecting for defective conditions of the sensing circuit 3 as well as of the entire air bag trigger circuit 5. The detection circuit 8 has a detection line connected to the sensing circuit 3, which line has installed therein a protection resistor 14.

As will be understood from the foregoing description, according to this embodiment, the impact sensing circuit 3 includes a plurality of impact sensors, that is, the sensors 10a, 10b, connected in series. Therefore, even when any of them is operating defectively and happens to erroneously close, the entire sensing circuit 3 will not be short-circuited, thus preventing the squib 4 from undesired explosion.

As will be understood from the foregoing description, according to the foregoing embodiment, there can be achieved such advantages as follows.

First, as being substantially directly connected to the power source 1a, the air bag trigger circuit 5 is always rendered operable. As a result, exemplarily, even if, just after having stopped at a certain place and turned off the ignition switch 7 thereof, the vehicle equipped with the air bag device 1 is collided with by another vehicle, the trigger circuit 5 is permitted to function to inflate the air bag as circumstances require, thereby effectively protecting the driver from the impact of such collision.

Figure 2:
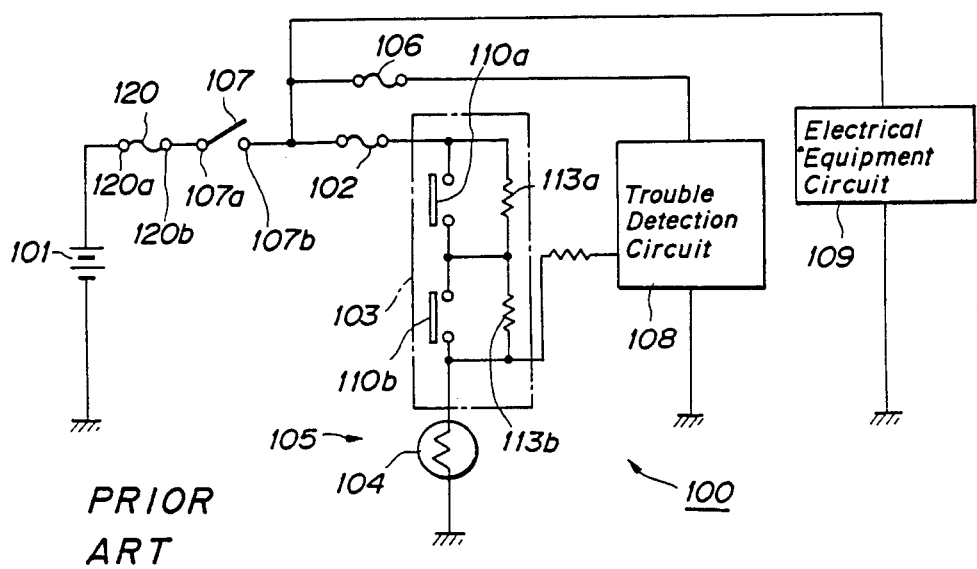
FIG. 2 shows an electric circuit diagram of a conventional air bag device for vehicles, as described.

Moreover, when compared with the conventional air bag device 100 of FIG. 2, in the present embodiment, the wiring from the power source 1a to the power source side terminal 3a of the impact sensing circuit 3 can be shortened, thus decreasing the wiring resistance therebetween, while minimizing the fear of disconnection as well.

Further, because of the substantially direct connection to the power source 1a, the air bag trigger circuit 5 is kept free from effects of the chattering of the ignition switch 7. Similarly the trigger circuit 5 is unlikely to be affected by the load condition of the electrical equipment as put in service. As a result, a stable current is conducted through the trigger circuit 5.

Furthermore, besides the constantly operative condition achieved by direct connection of the air bag trigger circuit 5 to the power source 1a, the conduction of electric current through the impact sensing circuit 3 and the squib 4 is permitted only while the ignition switch 7 is closed, by the provision of the relay switch 12 of which the on-off contact 11 is adapted to be operated in a manner following the on-off action of the ignition switch 7. The relay switch 12 is connected, when operated, in series with the shunt resistors 13a, 13b which are connected, for trouble detection of the impact sensors 10a, 10b, in parallel thereto, so that the squib 4 will effectively have a slow rate of deterioration and, moreover, the possibility of undesirable discharge of the power source 1a is reduced.

Still more, since, in the impact sensing circuit 3, the relay switch 12 is disposed at the side of the shunt resistors 13a, 13b, the impact sensors 10a, 10b are favorably kept free from effects of the chattering of the relay switch 12, thus, also minimizing the fear of misfire of the squib 4 at the collision of the vehicle.

Incidentally, in the foregoing embodiment, the number of impact sensors may advantageously be modified to only one or to three or more, as a matter of course.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. In an air bag device (1) for a vehicle having an electric power source (1a), and an ignition switch (7) operatively connected to said power source (1a),
   an improvement comprising:
   an air bag trigger circuit (5) substantially directly connected to said power source (1a),
   wherein:
   said trigger circuit comprises an impact sensing circuit (3) and an air bag inflation squib (4) adapted for expanding to inflate an air bag and connected in series to said sensing circuit (3);
   said sensing circuit (3) including an impact sensor (10a, 10b) adapted to close when the vehicle is subjected to an impact of a larger magnitude than a predetermined value and a combination of a shunt resistor (13a, 13b) and switch means (12) interconnected in series, said combination being connected in parallel to said impact sensor (10a, 10b), and said switch means being adapted to open and close in an interlocked manner with the opening and closing of said ignition switch (7),
   such that when said impact sensor (10a, 10b) is closed, a short circuit current is conducted across said squib (4), thereby causing the squib to expand to inflate said air bag;
   said air bag device further comprising a trouble detection circuit (8, 14) operatively connected to said sensing circuit (3), to check for a defective condition of said sensing circuit (3) by detecting variations in the quantity of an electric current running through said sensing circuit (3) under a condition that said ignition switch (7) is closed; and
   said trouble detection circuit (8, 14) being operatively connected to said ignition switch (7), to operate under the condition that said ignition switch (7) is closed.

2. An air bag device (1) according to claim 1, wherein:
   said impact sensor (10a, 10b) comprises a plurality of impact sensing elements (10a, 10b) connected in series thereamong.

3. An air bag device (1) according to claim 1, wherein said impact sensing circuit (3) of said trigger circuit (5) is connected to a positive terminal (1b) of said power source (1a); and
   said squib (4) is grounded.

* * * * *